United States Patent
Tsurumi et al.

(10) Patent No.: US 7,481,304 B2
(45) Date of Patent: Jan. 27, 2009

(54) PAD ASSEMBLY FOR DISC BRAKE

(75) Inventors: Hidetoshi Tsurumi, Tokyo (JP); Takaaki Sasaki, Tokyo (JP)

(73) Assignee: Akebono Brake Industry Co., Ltd., Tokyo (JP)

( * ) Notice: Subject to any disclaimer, the term of this patent is extended or adjusted under 35 U.S.C. 154(b) by 194 days.

(21) Appl. No.: 11/333,324

(22) Filed: Jan. 18, 2006

(65) Prior Publication Data

US 2006/0157307 A1 Jul. 20, 2006

(30) Foreign Application Priority Data

Jan. 18, 2005 (JP) .......................... P.2005-010063

(51) Int. Cl.
*F16D 65/38* (2006.01)
(52) U.S. Cl. .............. 188/73.36; 188/73.37; 188/250 E
(58) Field of Classification Search .............. 188/73.35, 188/73.36, 73.37, 258, 250 D, 250 E, 250 F, 188/250 G; 192/30 V
See application file for complete search history.

(56) References Cited

U.S. PATENT DOCUMENTS

| | | | | |
|---|---|---|---|---|
| 5,320,200 A | * | 6/1994 | Hashimoto | 188/250 E |
| 5,975,252 A | * | 11/1999 | Suzuki et al. | 188/73.1 |
| 6,481,545 B1 | * | 11/2002 | Yano et al. | 188/264 G |
| 2004/0188190 A1 | * | 9/2004 | Niwa et al. | 188/73.37 |
| 2006/0027427 A1 | * | 2/2006 | Anda et al. | 188/73.1 |

FOREIGN PATENT DOCUMENTS

| | | |
|---|---|---|
| JP | 59-47535 | 3/1984 |
| JP | 62-122931 U | 8/1987 |
| JP | 3-112143 U | 11/1991 |
| JP | 4-127437 U | 11/1992 |
| JP | Y-06-011377 | 3/1994 |
| JP | 11-62916 | 3/1999 |
| JP | 2006183808 A * | 7/2006 |

* cited by examiner

*Primary Examiner*—Xuan Lan Nguyen
(74) *Attorney, Agent, or Firm*—Morgan, Lewis & Bockius LLP (57) ABSTRACT

First to third inner locking pieces 12 to 14 are provided at both ends of an inner shim plate 2a in a radial direction of a rotor so as to be bent toward the pad, respectively. First to third outer locking pieces 15, 17 and 18 are provided at both ends of an outer shim plate 1a in the radial direction of the rotor so as to be bent in the same direction as the locking pieces 12 to 14. An inner shim plate 2a is mounted on a pressure plate 10, and the first to third outer locking pieces 15, 17 and 18 are superimposed on the first to third inner locking pieces 12 to 14 such that main body parts 7 and 8 of the respective shim plates 2a and 1a are locked in the pad in the axial direction of the rotor.

25 Claims, 5 Drawing Sheets

Prior Art

PAD ASSEMBLY FOR DISC BRAKE

The present application claims foreign priority based on Japanese Patent Application No. P.2005-010063, filed on Jan. 18, 2005, the contents of which are incorporated herein by reference.

BACKGROUND OF THE INVENTION

1. Field of the Invention

The present invention relates to a pad assembly for a disc brake, which is assembled in a disc brake of a vehicle, for preventing a noise of braking and uneven wear of a pad.

2. Related Art

In order to prevent a noise of a disc brake and uneven wear of a pad, there is a disc brake in which a shim plate is provided between a claw portion of a caliper and a front end surface of a piston, and the pad. When the claw portion of the caliper and the front end surface of the piston are directly brought into contact with a rear surface of a pressure plate constituting the pad, accompanying the pad which moves in a circumferential direction of a rotor while braking, the caliper has tendency to move in the circumferential direction of the rotor by a frictional force generated between the caliper and the pad. Accordingly, a movement of the caliper becomes in an unstable state, and thus, uneven wear is likely to occur in a lining of the pad in the circumferential direction. When the uneven wear occurs, the pad rapidly reaches a wear threshold or the surface pressure applied between the pad and the rotor becomes uneven in the circumferential direction, so that the noise of a brake can be easily generated.

To prevent the above-described drawbacks, there has been provided with a shim plate made of a sheet of stainless steel plate between the claw portion of the caliper and the front end surface of the piston, and the rear surface of the pressure plate constituting the pad. In addition, there has been designed that locking pieces provided at ends of the shim plate are slidably fixed to an outer periphery of the pressure plate in the circumferential direction of the rotor. By making it easy to relatively displace the caliper and the pad during braking, the movement of the caliper can become stable so that the uneven wear hardly occurs in the pad. However, in the disc brake, if the rear surface of the pressure plate has low roughness precision (rough), it is hard to achieve desired sliding characteristics with respect to the rear surface of the shim plate, and thus the above-described effect cannot be achieved.

Figure 5:
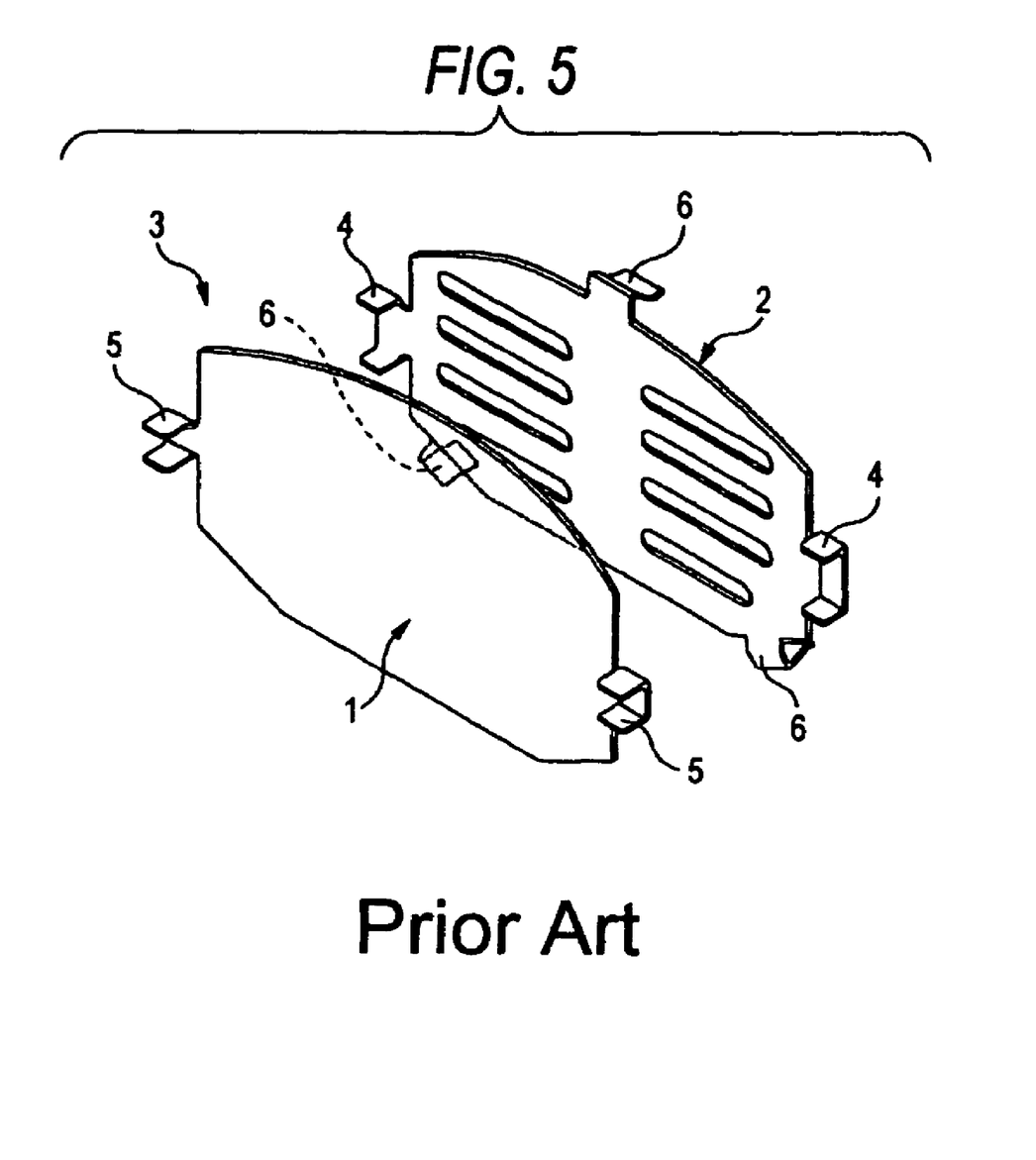
FIG. 5 is an exploded perspective view showing an example of a shim plate set according to related art.

In this respect, disclosed in JP-Y-06-011377 is a disc brake, in which a shim plate set 3 made by superimposing a pair of inner and outer shim plates 1 and 2, as shown in FIG. 5, is provided between a claw portion of caliper and a piston, and a rear surface of a pressure plate constituting a pad. In the disc brake of JP-Y-06-011377, both ends in a width direction (right and left side of FIG. 5) of the inner shim plate 2 on the pad side (inner side of FIG. 5), and both ends in the width direction (right and left side of FIG. 5) of the outer shim plate 1 on a counter-pad side (outer side of FIG. 5) are respectively provided with guiding parts 4 and 5. The guiding parts 4 and 5 are bent in a U-shape viewed from a section view, and their opened sides are respectively facing the counter-pad side. While the inner shim plate 2 and the outer shim plate 1 are superimposed on each other, a pair of guiding parts 5 and 5 is disposed at the inner side of a pair of guiding parts 4 and 4 provided at the inner shim plate 2, maintaining a gap in a radial direction of the rotor (top and bottom of FIG. 5) thereby guiding the outer shim plate 1 to move in the circumferential of the rotor with respect to the inner shim plate 2. Further, both ends of the inner shim plate 2 in the radial direction of the rotor (top and bottom of FIG. 5) are provided with a plurality of locking parts 6 and 6 which are bent toward the pad, so that the inner shim plate 2 can be locked with the pressure plate by the locking parts 6 and 6.

In the structure described in JP-Y-06-011377, frictional force to be applied between the inner shim plate 2 and the outer shim plate 1 can be easily made smaller than frictional force applied between the rear surface of the pressure plate and the inner shim plate 2. For this reason, even when the rear surface of the pressure plate has low roughness precision (rough), the movement of the caliper can be made stable by smoothly deviating the caliper and the pad each other while braking. Therefore, it is possible to prevent uneven wear on the pad.

In the structure in JP-Y-06-011377, while the inner shim plate 2 is fixed to the pad by the plurality of locking parts 6 and 6, the outer shim plate 1 is not prevented from moving in an axial direction of the rotor (front and back side of FIG. 5) with respect to the inner shim plate 2. For this reason, the outer shim plate 1 can be easily separated from the pad, and handling and workability for assembling the pad and the shim plate set 3 is difficult prior to mounting to the disc brake. In the structure described in JP-Y-06-011377, the plurality of guiding parts 4 and 5 are provided to guide the outer shim plate 1 in the circumferential direction of the rotor with respect to the inner shim plate 2, and the plurality of locking parts 6 and 6 are provided to have the inner shim plate 2 locked with the pad. Accordingly, the whole structure of the inner and outer shim plates 1 and 2 should have a number of bent parts, and the bent parts are not uniformly bent in one direction, which causes cost to increase.

SUMMARY OF THE INVENTION

The present invention has been made in consideration of the drawbacks of the pad assembly for a disc brake according to the related art.

In accordance with one or more embodiments of the present invention, a pad assembly for a disc brake is provided with an inner shim plate which is additionally provided to a rear surface of a pressure plate constituting a pad disposed on a side surface of a rotor in an axial direction thereof; an outer shim plate which is directly or indirectly superimposed on the inner shim plate with other members interposed therebetween; inner locking pieces which are provided at both ends of the inner shim plate in a radial direction of the rotor so as to be bent toward one side of the inner shim plate, and which lock an outer peripheral surface of the pressure plate; outer locking pieces which are provided at both ends of the outer shim plate in the radial direction of the rotor so as to be bent in the same direction as the inner locking pieces. The outer locking pieces are superimposed on the inner locking pieces. In addition, the outer shim plate is movable toward a circumferential direction of the rotor with respect to the inner shim plate. In the entire specification and claims, 'the radial direction of the rotor', 'the circumferential direction of the rotor', and 'the axial direction of the rotor' indicate directions of the rotor when the pad assembly for a disc brake is mounted in the disc brake.

In the pad assembly for a disc brake having the above-described structure according to the one or more embodiments of the present invention, the outer shim plate, or the other member between the inner and outer shim plates, is smoothly slidable in the circumferential direction of the rotor with respect to the inner shim plate. Therefore, even though the pad moves in the circumferential direction of the rotor by the rotor during braking, the movement of caliper can be stable, and thus uneven wear of the pad and the noise of brake can be prevented.

Moreover, in accordance with the one or more embodiments of the present invention, the plurality of the outer locking pieces which are bent in the same direction as the inner locking pieces are superimposed on the plurality of the inner locking pieces which are bent toward one side of the inner shim plate to lock an outer peripheral surface of the pressure. Accordingly, the outer shim plate is prevented from being separated from the inner shim plate in the axial direction of the rotor. As a result, workability of mounting the pad assembly, consisting of the respective shim plates and the pad, on the disc brake can be improved.

In addition, after the inner shim plate is mounted on the pressure plate by using the respective inner locking pieces, the inner locking pieces are locked with the outer locking pieces in the axial direction of the rotor. Thus, the outer shim plate can be guided to move in the circumferential direction of the rotor with respect to the inner shim plate. Further, the inner locking pieces can make the inner shim plate to lock the pad. Accordingly, it is possible to have a fewer number of bent parts for the inner and outer shim plates, and thus the cost of the disc brake can be decreased.

Further, in accordance with one or more embodiments of the present invention, a width Wa of one inner locking piece may be set to be larger than a width Wc of the outer locking piece corresponding to the inner locking piece (Wa>Wc), or a distance Wb between a pair of edges located on the outermost side in the circumferential direction of the rotor among a plurality of the inner locking pieces may be set to be larger than a distance Wd between a pair of edges located on the outermost side in the circumferential direction of the rotor among a plurality of the outer locking pieces (Wb>Wd).

In the structure, the outer shim plate is smoothly movable in the circumferential direction of the rotor with respect to the inner shim plate.

In addition, in accordance with one or more embodiments of the present invention, a maximum value L1 of a distance between outer surfaces of a pair of the inner locking pieces provided at both ends of the inner shim plate in a radial direction of the rotor may be set to be larger than a minimum value L2 of a distance between inner surfaces of a pair of the outer locking pieces provided at both ends of the inner shim plate in a radial direction of the rotor (L1>L2).

In the structure, a length in the axial direction of the rotor of the main body part, between the farthest part from the center in the radial direction of the rotor of the inner shim plate on the outer surface of the pair of the inner locking pieces and the outer surface of the main body part of the inner shim plate, and a length in the axial direction of the rotor of the main body part, between the closest part to the center in the radial direction of the rotor of the outer shim plate on the inner surface of the pair of the outer locking pieces and the inner surface of the main body part of the outer shim plate, are properly regulated. Therefore, the outer shim plate is prevented from being separated from the inner shim plate. As a result, workability of mounting the pad assembly, consisting of the respective shim plates and the pad, on the disc brake can be improved.

In addition, in accordance with one or more embodiments of the present invention, each inner locking piece which directs from the base end to the middle part thereof may be inclined toward the center of the radial direction of the rotor of the inner shim plate.

In addition, in accordance with one or more embodiments of the present invention, a fastening margin, between the respective outer locking pieces and the respective inner locking pieces which are additionally provided on the pressure plate (in a state in which the inner shim plate and the outer shim plate are mounted on the pressure plate), may be set to be substantially zero. In the structure, the outer shim plate can be smoothly movable in the circumferential direction of the rotor with respect to the inner shim plate without rattling.

Other aspects and advantages of the invention will be apparent from the following description and the appended claims.

REFERENCE NUMERALS 1, 1a: OUTER SHIM PLATE
2, 2a: INNER SHIM PLATE
3: SHIM PLATE SET
4: GUIDING PART
5: GUIDING PART
6: LOCKING PART
7: MAIN BODY PART
8: MAIN BODY PART
9: PAD
10: PRESSURE PLATE
11: PERFORATION HOLE
12: FIRST INNER LOCKING PIECE
13: SECOND INNER LOCKING PIECE
14: THIRD INNER LOCKING PIECE
15: FIRST OUTER LOCKING PIECE
16: ELONGATED HOLE
17: SECOND OUTER LOCKING PIECE
18: THIRD OUTER LOCKING PIECE
19, 19a: PAD ASSEMBLY
20, 20b: LOCKING CONCAVE GROOVE
21: LINING
22: INTERMEDIATE SHIM PLATE

DESCRIPTION OF THE PREFERRED EMBODIMENTS

Embodiments of the invention will be described with reference to the accompanying drawings.

First Embodiment

Figure 1:
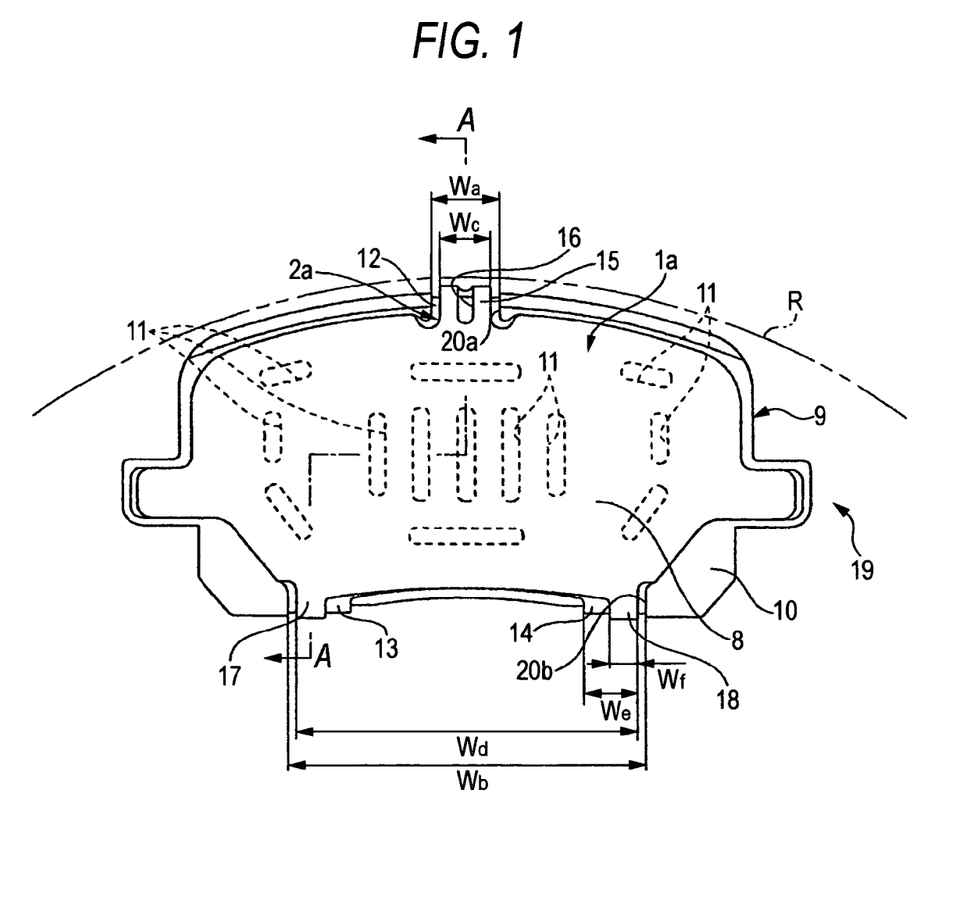
FIG. 1 is a view showing a pad assembly according to a first embodiment of the invention.
Figure 2:
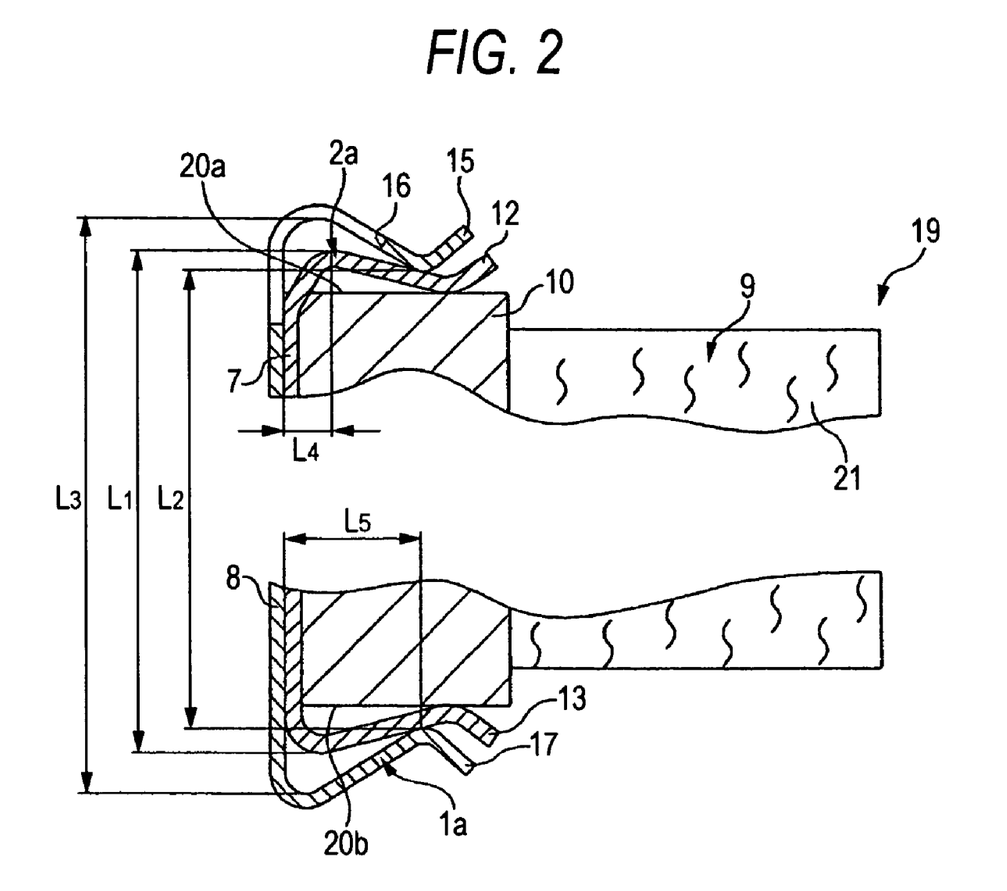
FIG. 2 is a cross-sectional view showing the pad assembly taken from the line A-A of FIG. 1.
Figure 3:
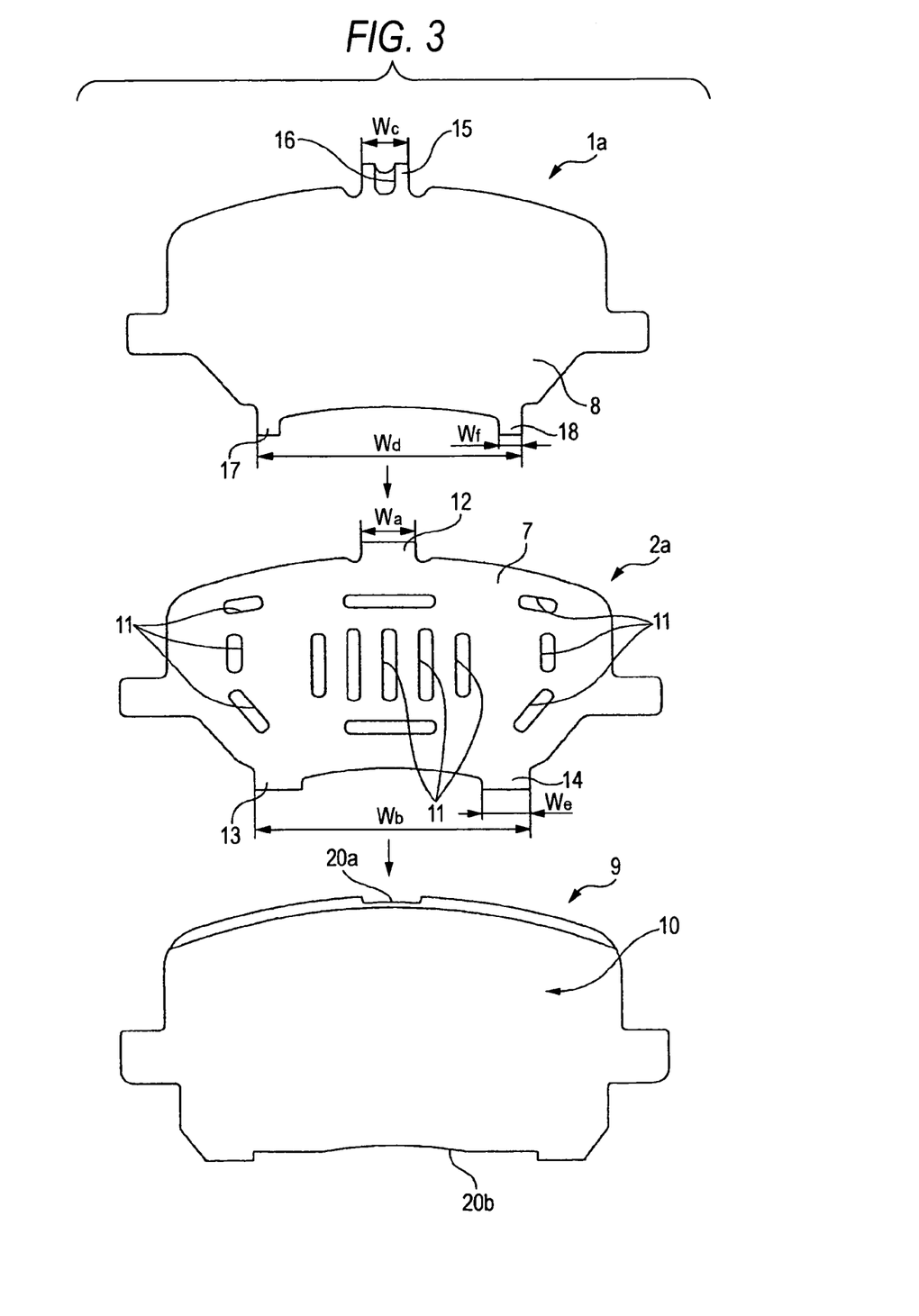
FIG. 3 is an exploded view showing the pad assembly.

A first embodiment of the invention will be described with reference to FIGS. 1 to 3. A pad assembly 19 for a disc brake according to the present embodiment is provided with an inner shim plate 2a additionally provided at a rear surface (right side surface of FIG. 2) of a pressure plate 10 of a pad 9, and an outer shim plate 1a whose main body part 8 is directly superimposed on a main body part 7 of the inner shim plate 2a. The inner shim plate 2a is made of metal materials such as stainless steel like SUS301-CSP. One surface (rear surface of FIGS. 1 and 3, right surface of FIG. 2) of the main body part 7 of the inner shim plate 2a is coated with NBR-based rubber. Perforation holes 11 and 11 are formed in a plurality of places of the main body part 7 in an axial direction of a rotor which is indicated by R, that is, a width direction of the main body part 7.

An outer end in a rotor radial direction, that is, an end (upper end of FIGS. 1 to 3) in a height direction of the main body part 7 is provided with a first inner locking piece 12 formed in a hook shape in the center in a circumferential direction of the rotor (right and left side of FIGS. 1 and 3, front and rear side of FIG. 2) such that the first inner locking piece 12 is bent toward one side (rear side of FIGS. 1 and 3, right side of FIG. 2) of the inner shim plate 2a. The first inner locking piece 12 which directs from the base end to the middle part thereof is inclined toward the center of the radial direction of the rotor of the inner shim plate 2a, and a front end thereof is inclined away from the center of the radial direction.

An inner end in the radial direction of the rotor, that is, the other end (lower end of FIGS. 1 to 3) in the height direction of the main body part 7 is provided with second and third inner locking pieces 13 and 14 formed in a hook shape at both ends in the circumferential direction of the rotor such that the second and third inner locking pieces 13 and 14 are bent in the same direction as the first locking piece 12. The second and third inner locking pieces 13 and 14 which directs from the base end to the middle part thereof is also inclined toward the center of the radial direction of the rotor of the inner shim plate 2a, and a front end thereof is inclined toward away from the center of the radial direction. The first to third inner locking pieces 12 to 14 are locked in the pressure plate 10 constituting the pad 9 on an outer peripheral surface of the pressure plate 10 such that the pressure plate 10 is fitted into between both side surfaces in the radial direction of the rotor (top and bottom side of FIGS. 1 to 3) by the respective locking pieces 12 to 14, thereby providing the inner shim plate 2a at the rear side (surface of FIGS. 1 and 3, left surface of FIG. 2) of the pressure plate 10. Further, locking concave grooves 20a and 20b are formed in the middle in the circumferential direction of the rotor of both sides in the radial direction of the rotor of the pressure plate 10, the first to third inner locking pieces 12 to 14 are fixed in a state locked in the respective locking concave grooves 20a and 20b. The pad 9 is additionally provided with a lining 21 at the rotor side (rear surface of FIGS. 1 and 3, right surface of FIG. 2) of the pressure plate 10.

In the meantime, the outer shim plate 1a is made of metal materials such as stainless steel like SUS301-CSP. an outer end in the radial direction of the rotor, that is, one end (upper end of FIGS. 1 to 3) in a height direction of the main body part 8 of the outer shim plate 1a is provided with a first outer locking piece 15, formed in a hook shape in the center in the circumferential direction of the rotor, to be fitted with the first inner locking piece 12 such that the first outer locking piece 15 is bent toward one side (rear side of FIGS. 1 to 3, right side of FIG. 2) of the outer shim plate 1a. The first outer locking piece 15 which directs from the base end to the middle part thereof is inclined toward the center of the radial direction of the rotor of the outer shim plate 1a, and a front end thereof is inclined toward away from the center of the radial direction. Further, an elongated hole 16 is formed in the center of the first outer locking piece 15 such that the elongated hole 16 perforates both sides of the first outer locking piece 15.

An inner end in the radial direction of the rotor, that is, the other end (lower end of FIGS. 1 to 3) in the height direction of the main body part 8 of the outer shim plate 1a is provided with second and third outer locking piece 17 and 18, formed in a hook shape on both ends in the circumferential direction of the rotor, to be fitted with the second and third inner locking piece 13 and 14 such that the second and third outer locking piece 17 and 18 are bent in the same direction as the first outer locking piece 15. The second and third outer locking pieces 17 and 18 which directs from the base end to the middle part thereof is inclined toward the center of the radial direction of the rotor of the outer shim plate 1a, and a front end thereof is inclined toward away from the center of the radial direction, as well as the first outer locking piece 15.

In a state in which one surface of the main body part 7 of the inner shim plate 2a is additionally provided at the rear side of the pressure plate 10, after the inner shim plate 2a is locked in the pressure plate 10, while one surface (rear surface of FIGS. 1 and 3, right surface of FIG. 2) of the main body part 8 of the outer shim plate 1a is superimposed on the other surface (surface of FIGS. 1 and 3, left surface of FIG. 2) of the main body part 7, the first to third inner locking pieces 15, 17 and 18 are overlaid on the first to third inner locking pieces 12 to 14. In this state, front ends of the first to third outer locking pieces 15, 17 and 18 are brought to abut front ends of the first to third inner locking pieces 12 to 14, respectively.

In the present embodiment, a width Wa of the first inner locking piece 12 is set to be larger than a width Wc of the first outer locking piece 15 (Wa>Wc). A distance Wb between outer edges of the second and third inner locking pieces 13 and 14 located on the outermost side in the circumferential direction of the rotor of the inner shim plate 2a is set to be larger than a distance Wd between outer edges of the second and third outer locking pieces 17 and 18 located on the outermost side in the circumferential direction of the rotor of the outer shim plate 1a (Wb>Wd).

In a state in which the inner shim plate 2a and the outer shim plate 1a are mounted on the pressure plate 10 of the pad 9, a maximum value L1 of a distance between outer surfaces on the base end of a pair of the first and second inner locking pieces 12 and 13 (and the first and third inner locking pieces 12 and 14) provided at both ends of the inner shim plate 2a in the radial direction of the rotor is set to be larger than a minimum value L2 of a distance between inner surfaces on the front end of a pair of the first and second outer locking pieces 15 and 17 (and the first and third outer locking pieces 15 and 18) provided at both ends of the outer shim plate 1a (L1>L2) in the radial direction of the rotor. In addition, a maximum value L3 of a distance between inner surfaces on the base end of a pair of the first and second outer locking pieces 15 and 17 (and the first and third outer locking pieces 15 and 18) provided at both ends of the outer shim plate 1a in the radial direction of the rotor is set to be larger than the maximum value L1 of a distance between outer surfaces on the base end of a pair of the first and second inner locking pieces 12 and 13 (and the first and third inner locking pieces 12 and 14) provided at both ends of the inner shim plate 2a in the radial direction of the rotor (L3>L1).

In the base end of the pair of the first and second inner locking pieces 12 and 13 (and the first and third inner locking pieces 12 and 14), a length in the axial direction of the rotor of the main bodypart 7, between the farthest part (corresponding to the maximum value L1) from the center in the radial direction of the rotor of the inner shim plate 2a and the outer surface (left surface of FIG. 2) of the main body part 7 of the inner shim plate 2a, is defined as L4. In a front end of the pair of the first and second outer locking pieces 15 and 17 (and the first and third outer locking pieces 15 and 18) provided at both ends of the outer shim plate 1a in the radial direction of the rotor, a length in the axial direction of the rotor of the main body part 8, between the closest part (corresponding to the minimum value L2) to the center in the radial direction of the rotor of the outer shim plate 1a and the inner surface (right surface of FIG. 2) of the main body part 8 of the outer shim plate 1a, is defined as L5. When the length L4 and L5 is defined in this way, dimensions of the respective parts are regulated under the relationship L4<L5.

In this state, a fastening margin in a height direction of the shim plates 1a and 2a, between the first to third outer locking pieces 15, 17 and 18 and the first to third inner locking pieces 12 to 14, is set to be about zero with dimensional tolerances in the range of −0.50 mm to +0.50 mm. While allowing the first to third outer locking pieces 15, 17 and 18 to slide in the circumferential direction of the rotor (right and left side of FIGS. 1 and 3, rear side of FIG. 2) of the respective shim plates 1a and 2a with respect to the first to third inner locking pieces 12 to 14, the outer locking pieces 15, 17 and 18 are locked in the inner locking pieces 12 to 14 in the axial direction of the rotor (rear side of FIGS. 1 and 3, right and left side of FIG. 2) of the main body parts 7 and 8 of the respective shim plates 1a and 2a. When the respective shim plates 1a and 2a are being mounted, the outer locking pieces 15, 17 and 18 are locked in the inner locking pieces 12 to 14 by, for example, elastically deforming parts provided at both of the ends in the height direction of the outer locking pieces 15, 17 and 18 so as to widen a distance between the parts. By weakening rigidity of the outer locking pieces 15, 17 and 18 so as to be weaker than rigidity of the inner locking pieces 12 to 14 to be locked therein, it becomes easy to elastically deform the parts so that the shim plates 1a and 2a can be mounted on the pressure plate 10 of the pad 9 in an easier manner.

In the main body part 7 (or 8) of at least one shim plate 2a (or 1a) of the inner shim plate 2a and the outer shim plate 1a, a surface which faces the counter-shim plate 1a (or 2a) is coated with grease. Instead, in the main body part 7 (or 8) of at least one shim plate 2a (or 1a) of the inner shim plate 2a and the outer shim plate 1a, a surface which faces the counter-shim plate 1a (or 2a) may be coated with fluorine. Especially in this case, the sliding becomes smoother. On the other hand, when both of the shim plates 2a and 1a are reliably sliding to each other, contact parts of both shim plates 2a and 1a may be directly in contact with each other without applying anything on the stainless steel. Contact parts of the first to third inner locking pieces 12 to 14 are in contact with the first to third outer locking pieces 15, 17 and 18 such that the contacted positions are arranged in a straight line substantially parallel to the width direction of the inner and outer shim plates 2a and 1a. Here, the first to third outer locking pieces 15, 17 and 18 can move until edges in the width direction of the outer locking pieces 15, 17 and 18 abut the inner surface in the width direction of the respective locking concave grooves 20a and 20b of the pressure plate 10.

In the pad assembly 19 for a disc brake according to the present embodiment, which is constituted as described above, the outer shim plate 1a can be smoothly sliding in the width direction with respect to the inner shim plate 2a. Therefore, even though the pad 9 moves in the circumferential direction of the rotor by frictional force from the rotor while braking, the movement of caliper (not shown) can be made stable, so that uneven wear of the pad 9 and the noise of brake can be prevented.

Moreover, in the embodiments, the plurality of inner locking pieces 12 to 14 are locked in the pressure plate 10 on the outer peripheral surface of the pressure plate 10 in a state bent toward one side direction of the inner shim plate 2a, and the plurality of outer locking pieces 15, 17 and 18 of the outer shim plate 1a are bent in the same direction as the inner locking pieces 12 to 14 such that the plurality of outer locking pieces 15, 17 and 18 of the outer shim plate 1a are superimposed on the inner locking pieces 12 to 14. For this reason, the workability of mounting the pad assembly 19 on the disc brake can be improved since the outer shim plate 1a is prevented from being separated in the axial direction of the rotor of the main body parts 8 and 7 from the inner shim plate 2a. As the inner locking pieces 12 to 14 are locked in the outer locking pieces 15, 17 and 18 in the axial direction of the rotor of the main body parts 7 and 8, the outer shim plate 1a can be guided to move in the circumferential direction of the rotor with respect to the inner shim plate 2a. Further, the inner locking pieces 12 to 14 can make the inner shim plate 2a locked in the pad 9. Accordingly, it is possible to have a fewer number of bent parts for the inner and outer shim plates 1 and 2, and the bent parts are uniformly bent in one direction, and thus the cost of the disc brake can be decreased.

In the present embodiment, the width Wa of the first inner locking piece 12 is set to be larger than the width Wc of the first outer locking piece 15 (Wa>Wc). The distance Wb between outside edges of the second and third inner locking pieces 13 and 14 located on the outermost side in the circumferential direction of the rotor of the inner shim plate 2a is set to be larger than the distance Wd between outside edges of the second and third outer locking pieces 17 and 18 located on the outermost side in the circumferential direction of the rotor of the outer shim plate 1a (Wb>Wd). For this reason, it is possible to easily move the outer shim plate 1a smoothly in the circumferential direction of the rotor with respect to the inner shim plate 2a. Further, a width We of the second inner locking pieces 13 and 14 is set to be larger than a width Wf of the second outer locking pieces 17 and 18 (We<Wf), so that the outer shim plate 1a can move easily as well.

In the present embodiment, in a state in which the inner shim plate 2a and the outer shim plate 1a are mounted on the pressure plate 10 of the pad 9, the maximum value L1 of a distance between outer surfaces on the base end of the pair of the first and second inner locking pieces 12 and 13 (and the first and third inner locking pieces 12 and 14) provided at both ends of the inner shim plate 2a in the radial direction of the rotor is set to be larger than the minimum value L2 of a distance between inner surfaces on the front end of the pair of the first and second outer locking pieces 15 and 17 (and the first and third outer locking pieces 15 and 18) provided at both ends of the outer shim plate 1a in the radial direction of the rotor (L1>L2). Accordingly, as described above, in the base end of the pair of the first and second inner locking pieces 12 and 13 (and the first and third inner locking pieces 12 and 14), the length in the axial direction of the rotor of the main body part 7, between the farthest part from the center in the radial direction of the rotor of the inner shim plate 2a and the outer surface (left surface of FIG. 2) of the main body part 7 of the inner shim plate 2a, is defined as L4; in the front end of the pair of the first and second outer locking pieces 15 and 17 (and the first and third outer locking pieces 15 and 18), a length in the axial direction of the rotor of the main body part 8, between the closest part to the center in the radial direction of the rotor of the outer shim plate 1a and the inner surface (right surface of FIG. 2) of the main body part 8 of the outer shim plate 1a, is defined as L5; and dimensions of the respective parts are regulated under the relationship (L4<L5). Therefore, the outer shim plate 1a is prevented from being separated from the inner shim plate 2a. As a result, workability of mounting the pad assembly 19 on the disc brake can be improved.

In addition, in the present embodiment, the fastening margin in the height direction of the shim plates 1a and 2a, between the first to third outer locking pieces 15, 17 and 18 and the first to third inner locking pieces 12 to 14, is set to be about zero. Accordingly, the outer shim plate 1a can smoothly move in the circumferential direction of the rotor with respect to the inner shim plate 2a.

Second Embodiment

Figure 4:
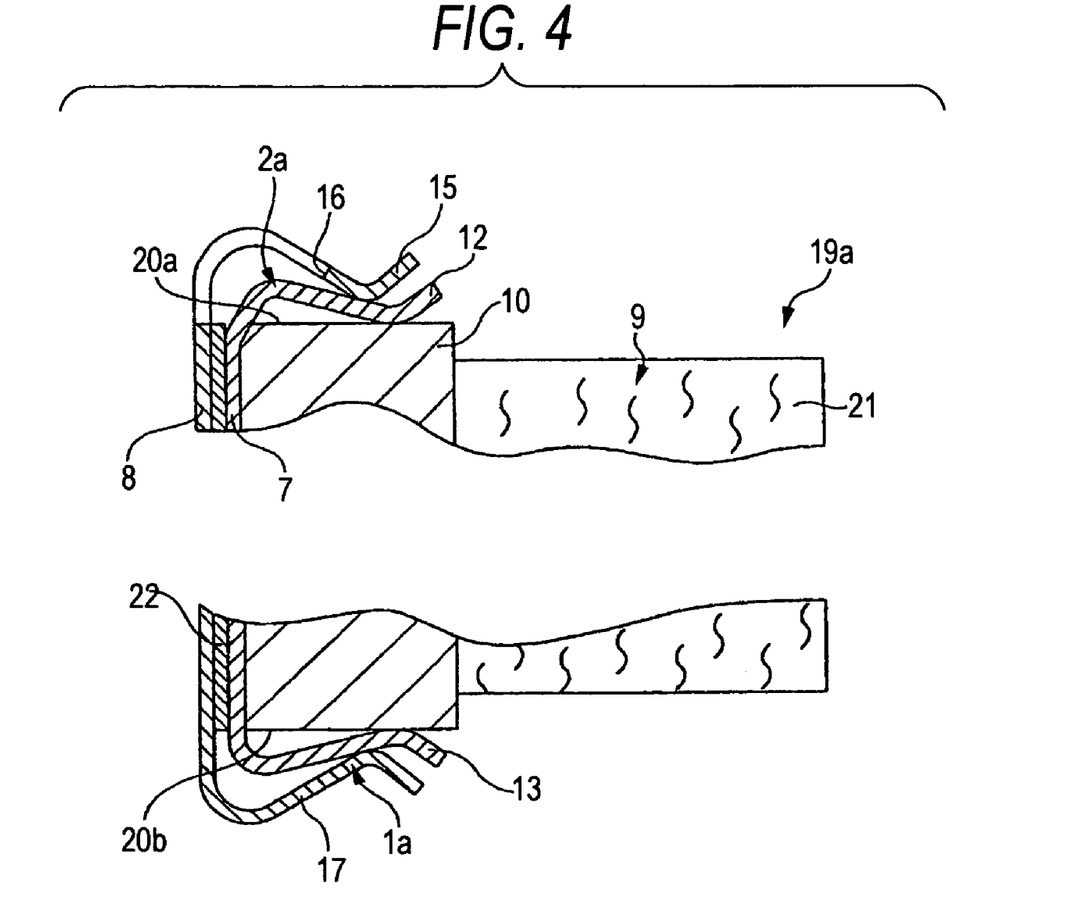
FIG. 4 is a cross-sectional view showing the pad assembly according to a second embodiment.

Next, FIG. 4 shows a second embodiment of the invention. Unlike the above-described first embodiment, in the second embodiment, one intermediate shimplate 22 is interposed between the main body part 7 of the inner shim plate 2a and the main body part 8 of the outer shim plate 1a. The intermediate shim plate 22 is formed of metal materials such as stainless steel like SUS301-CSP in at a bular'shape. At least one of the shim plates 22 and 2a is coated with grease such that grease is interposed between the intermediate shim plate 22 and the inner shim plate 2a. Further, at least one of the shim plates 22 and 1a is coated with grease such that grease is interposed between the intermediate shim plate 22 and the outer shim plate 1a.

In the present embodiment having the above-described constitution, the outer shim plate 1a can be smoothly sliding with respect to the intermediate shim plate 22. Further, since a pad assembly 19a is formed by mounting three shim plates 1a, 22 and 2a on the pressure plate 10 of the pad 9, the movement of the caliper can be made more stable by allowing more parts between the shim plates 1a, 22 and 2a to slide on each other. As a result, uneven wear of the pad 9 and the noise of a brake can be more effectively prevented.

Since other constitution and effect is the same as that of the first embodiment, constituent elements corresponding to those of the first embodiment are denoted by the same reference numerals and description thereof is omitted.

In the second embodiment presented of FIG. 4, one surface (right surface of FIG. 4) of the intermediate shim plate 22 may be coated with rubber. With this structure, even though the intermediate shim plate 22 is prevented from sliding on the inner shim plate 2a, the rubber layer absorbs vibrations transmitted from the pad 9 to the inner shim plate 2a, and thus it is possible to effectively prevent the noise of brake.

In addition, in the above-described respective embodiments, even though the outer shim plate 1a is mounted after the inner shim plate 2a is mounted on the pad 9, the structure is not limited thereto. That is, both of the shim plates 2a and 1a can be firstly superimposed on each other and then the superimposed shim plates 2a and 1a can be mounted on the pad 9.

Further, the pad assembly for a disc brake of the invention is not limited to be built in a floating caliper type disc brake, in which the caliper is supported so as to be movable in the rotor axial direction and a piston is provided at only one side of the caliper with respect to the rotor, and a pair of pads is pressed on both sides of the rotor by the claw portion of the caliper and the piston. For example, the pad assembly for a disc brake of the invention can be built in an opposed piston type disc brake, in which pistons are provided at both sides of the caliper with respect to the rotor, and a pair of pads is pressed on both sides of the rotor by these pistons.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. A pad assembly for a disc brake, comprising;
an inner shim plate provided to a rear surface of a pressure plate constituting a pad, the pad being disposed on a side surface of a rotor in an axial direction thereof;
an outer shim plate superimposed on the inner shim plate;
inner locking pieces provided at both ends of the inner shim plate in a radial direction of the rotor, wherein the inner locking pieces are bent toward one side of the inner shim plate, and the inner locking pieces are engaged on an outer peripheral surface of the pressure plate; and
outer locking pieces provided at both ends of the outer shim plate in the radial direction of the rotor, wherein the outer locking pieces are bent in the same direction as the inner locking pieces, and the outer locking pieces are superimposed on the inner locking pieces,
wherein the outer shim plate is movable toward a circumferential direction of the rotor with respect to the inner shim plate,
the inner locking pieces are in contact with the respective outer locking pieces at contact portions, and
the respective contact portions linearly extend in the circumferential direction.

2. The pad assembly according to claim 1, wherein the outer shim plate is directly superimposed on the inner shim plate.

3. The pad assembly according to claim 1, wherein the outer shim plate is indirectly superimposed on the inner shim plate, interposing other member therebetween.

4. The pad assembly according to claim 1, wherein a width (Wa) of one inner locking pieces is set to be larger than a width (Wc) of the outer locking piece corresponding to the one of inner locking pieces (Wa>Wc).

5. The pad assembly according to claim 1, wherein a maximum value (L1) of a distance between outer surfaces of a pair of the inner locking pieces provided at both ends of the inner shim plate in the radial direction of the rotor is set to be larger than a minimum value (L2) of a distance between inner surfaces of a pair of the outer locking pieces provided at both ends of the outer shim plate in a radial direction of the rotor (L1>L2).

6. The pad assembly according to claim 5, wherein a maximum value (L3) of an interval between inner surfaces at the base ends of the pair of the outer locking pieces in the radial direction is set to be larger than the maximum value (L1) of the interval between the outer surfaces of the pair of the inner locking pieces at both ends of the inner shim plate in the radial direction of the rotor (L3>L1).

7. The pad assembly for a disc brake according to claim 1, wherein a portion of an inner locking piece which directs from a base end of the inner locking piece to a middle part thereof is inclined toward the center of the radial direction of the rotor of the inner shim plate.

8. The pad assembly according to claim 1, wherein the widths of the inner locking pieces are larger than the widths of the respective outer locking pieces.

9. The pad assembly according to claim 1, wherein a length (L4) of the inner shim plate in an axial direction of the rotor between a farthest part from a center in a radial direction of the rotor and an outer surface is set to be smaller than a length (L5) of the outer shim plate in the axial direction of the rotor between a closest part to the center in the radial direction of the rotor plate and an inner surface (L4<L5).

10. The pad assembly according to claim 1, wherein the outer locking piece which directs from the base end to the middle part thereof is inclined toward the center of the radial direction of the rotor of the outer shim plate, and a front end thereof is inclined toward away from the center of the radial direction.

11. A pad assembly for a disc brake, comprising;
an inner shim plate provided to a rear surface of a pressure plate constituting a pad, the pad being disposed on a side surface of a rotor in an axial direction thereof;
an outer shim plate superimposed on the inner shim plate;
inner locking pieces provided at both ends of the inner shim plate in a radial direction of the rotor, wherein the inner locking pieces are bent toward one side of the inner shim plate, and the inner locking pieces are engaged on an outer peripheral surface of the pressure plate; and
outer locking pieces provided at both ends of the outer shim plate in the radial direction of the rotor, wherein the outer locking pieces are bent in the same direction as the inner locking pieces, the outer locking pieces contact the inner locking pieces, and the outer shim plate is secured to the inner shim plate in an axial direction of the rotor through the outer locking pieces of the outer shim plate,
wherein the outer shim plate is movable toward a circumferential direction of the rotor with respect to the inner shim plate.

12. The pad assembly according to claim 11, wherein the outer shim plate is directly superimposed on the inner shim plate.

13. The pad assembly according to claim 11, wherein the outer shim plate is indirectly superimposed on the inner shim plate, interposing other member therebetween.

14. The pad assembly according to claim 11, wherein a width (Wa) of one inner locking pieces is set to be larger than a width (Wc) of the outer locking piece corresponding to the one of inner locking pieces (Wa>Wc).

15. The pad assembly according to claim 11, wherein a distance (Wb) between a pair of edges located on an outermost side of a plurality the inner locking pieces in the circumferential direction of the rotor is set to be larger than a distance (Wd) between a pair of edges located in an outermost side of a plurality of the outer locking pieces in the circumferential direction of the rotor (Wb>Wd).

16. The pad assembly according to claim 11, wherein a maximum value (L1) of a distance between outer surfaces of a pair of the inner locking pieces provided at both ends of the inner shim plate in the radial direction of the rotor is set to be larger than a minimum value (L2) of a distance between inner surfaces of a pair of the outer locking pieces provided at both ends of the outer shim plate in a radial direction of the rotor (L1>L2).

17. The pad assembly according to claim 16, wherein a maximum value (L3) of an interval between inner surfaces at the base ends of the pair of the outer locking pieces in the radial direction is set to be larger than the maximum value (L1) of the interval between the outer surfaces of the pair of the inner locking pieces at both ends of the inner shim plate in the radial direction of the rotor (L3>L1).

18. The pad assembly for a disc brake according to claim 11, wherein a portion of an inner locking piece which directs from a base end of the inner locking piece to a middle part thereof is inclined toward the center of the radial direction of the rotor of the inner shim plate.

19. The pad assembly for a disc brake according to claim 11, wherein a fastening margin between the respective outer locking pieces and the respective inner locking pieces is set to be substantially zero.

20. The pad assembly according to claim 11, wherein the inner locking pieces are in contact with the respective outer locking pieces at contact portions, and the respective contact portions linearly extend in the circumferential direction.

21. The pad assembly according to claim 11, wherein the widths of the inner locking pieces are larger than the widths of the respective outer locking pieces.

22. The pad assembly according to claim 11, wherein a length (L4) of the inner shim plate in an axial direction of the rotor between a farthest part from a center in a radial direction of the rotor and an outer surface is set to be smaller than a length (L5) of the outer shim plate in the axial direction of the rotor between a closest part to the center in the radial direction of the rotor plate and an inner surface (L4<L5).

23. The pad assembly according to claim 11, wherein the outer locking piece which directs from the base end to the middle part thereof is inclined toward the center of the radial direction of the rotor of the outer shim plate, and
a front end thereof is inclined toward away from the center of the radial direction.

24. A pad assembly for a disc brake, comprising;
an inner shim plate provided to a rear surface of a pressure plate constituting a pad, the pad being disposed on a side surface of a rotor in an axial direction thereof;
an outer shim plate superimposed on the inner shim plate;
inner locking pieces provided at both ends of the inner shim plate in a radial direction of the rotor, wherein the inner locking pieces are bent toward one side of the inner shim plate, and the inner locking pieces are engaged on an outer peripheral surface of the pressure plate; and
outer locking pieces provided at both ends of the outer shim plate in the radial direction of the rotor, wherein the outer locking pieces are bent in the same direction as the inner locking pieces, and the outer locking pieces are superimposed on the inner locking pieces,
wherein the outer shim plate is movable toward a circumferential direction of the rotor with respect to the inner shim plate, and
a distance (Wb) between a pair of edges located on an outermost side of a plurality the inner locking pieces in the circumferential direction of the rotor is set to be larger than a distance (Wd) between a pair of edges located in an outermost side of a plurality of the outer locking pieces in the circumferential direction of the rotor (Wb>Wd).

25. A pad assembly for a disc brake, comprising;
an inner shim plate provided to a rear surface of a pressure plate constituting a pad, the pad being disposed on a side surface of a rotor in an axial direction thereof;
an outer shim plate superimposed on the inner shim plate;
inner locking pieces provided at both ends of the inner shim plate in a radial direction of the rotor, wherein the inner locking pieces are bent toward one side of the inner shim plate, and the inner locking pieces are engaged on an outer peripheral surface of the pressure plate; and
outer locking pieces provided at both ends of the outer shim plate in the radial direction of the rotor, wherein the outer locking pieces are bent in the same direction as the inner locking pieces, and the outer locking pieces are superimposed on the inner locking pieces,
wherein the outer shim plate is movable toward a circumferential direction of the rotor with respect to the inner shim plate, and
a fastening margin between the respective outer locking pieces and the respective inner locking pieces is set to be substantially zero.

* * * * *